United States Patent [19]
Divoux

[11] Patent Number: 6,061,801
[45] Date of Patent: May 9, 2000

[54] MEANS FOR REACTIVATING A SYSTEM OPERATING IN "SLEEP" MODE

[75] Inventor: Jean-Noël Divoux, La Chaux-de-Fonds, Switzerland

[73] Assignee: EM Microelectronic-Marin SA, Marin, Switzerland

[21] Appl. No.: 08/948,464

[22] Filed: Oct. 10, 1997

[30] Foreign Application Priority Data

Sep. 12, 1997 [EP] European Pat. Off. ............. 97115907

[51] Int. Cl.[7] .................................................. G06F 1/32
[52] U.S. Cl. ............................................................ 713/322
[58] Field of Search ................... 713/320–324, 713/601

[56] References Cited

U.S. PATENT DOCUMENTS

| | | | |
|---|---|---|---|
| 4,698,748 | 10/1987 | Juzswik et al. ........................ | 364/200 |
| 5,799,198 | 8/1998 | Fung ...................................... | 713/322 |
| 5,815,725 | 9/1998 | Felerbach .............................. | 713/322 |
| 5,930,516 | 7/1999 | Watts, Jr. et al. ..................... | 713/322 |

FOREIGN PATENT DOCUMENTS 0 474 963 A2  3/1992  European Pat. Off. .

*Primary Examiner*—Thomas M. Heckler

[57] ABSTRACT

The present invention concerns a system 1 supplied by an electric power source, and able to operate in "sleep" mode, this system including a system clock 12, oscillation detection means 13 for monitoring the activity of the system clock, and means 16 for reactivating the system when the latter is in "sleep" mode. This system is characterised in that the reactivating means are internal to the system, and in that they are arranged to form, as soon as the system passes into "sleep" mode, an autonomous time base, to reactivate this system at the end of a predetermined time interval and, when the system is not in "sleep" mode, to fulfil a different function to that of time base and reactivation. An advantage of the reactivating means of such a system lies in the fact that they can operate only with a current of the order of 1 nA.

6 Claims, 3 Drawing Sheets

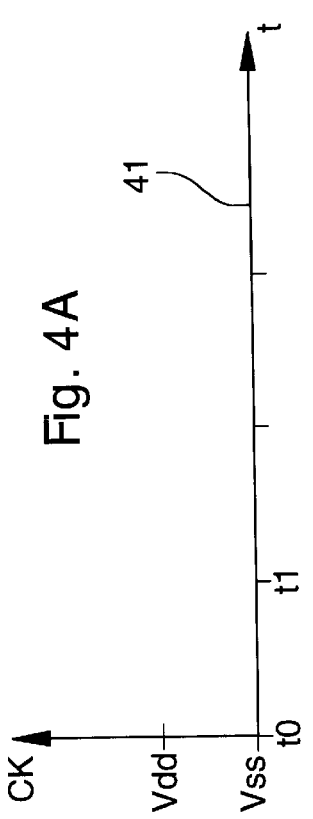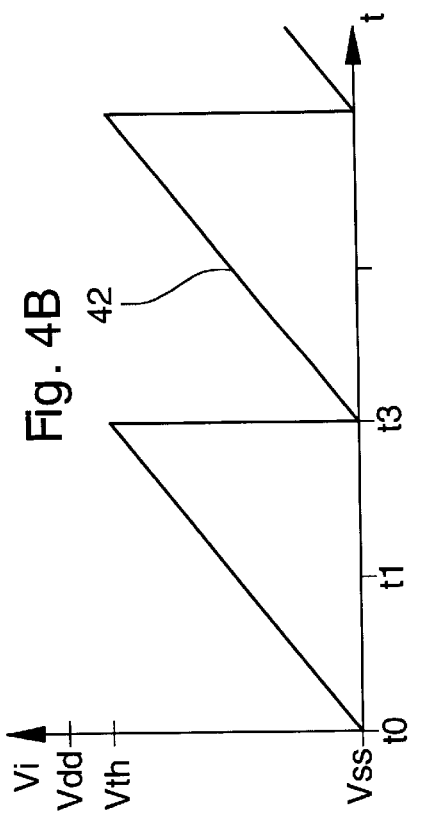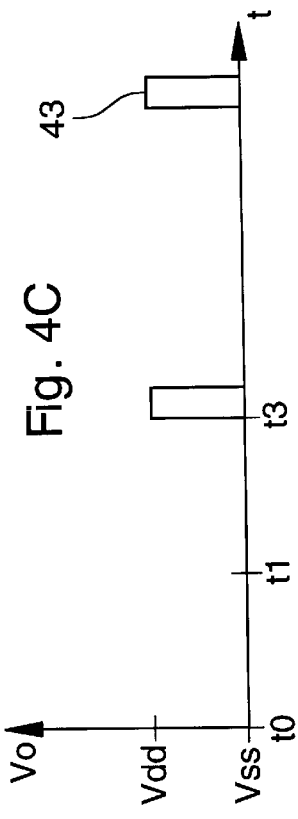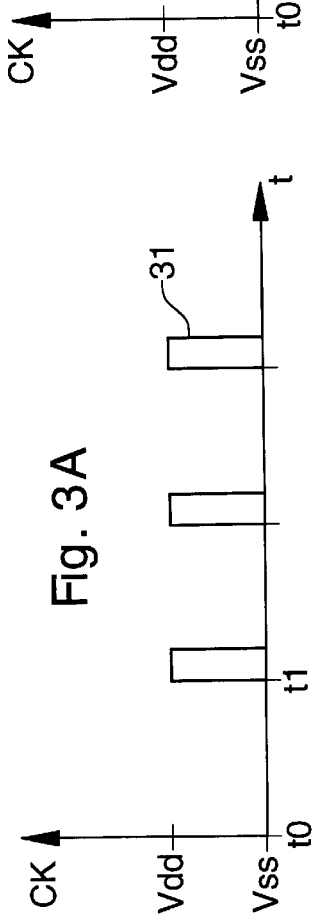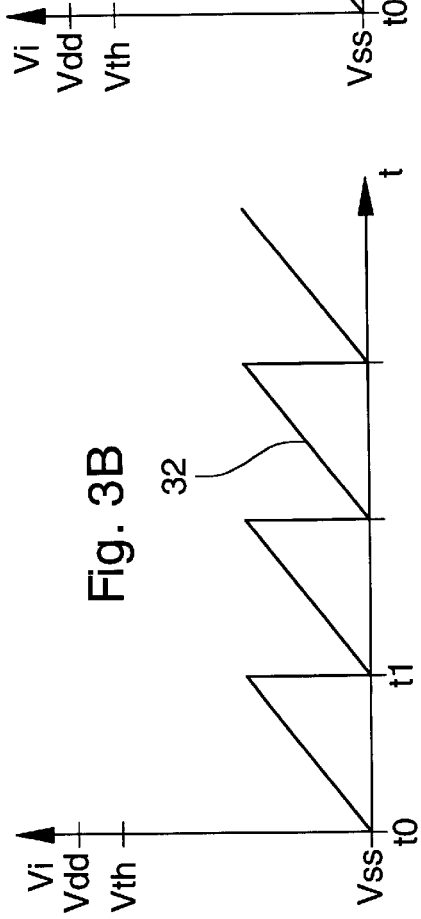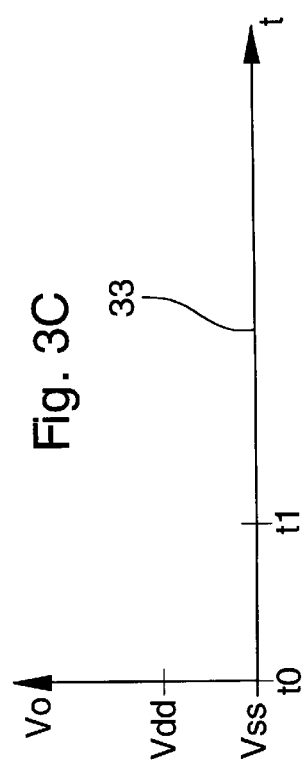

MEANS FOR REACTIVATING A SYSTEM OPERATING IN "SLEEP" MODE

BACKGROUND OF THE INVENTION

1. Field of the Invention

The present invention concerns the field of electronic circuits and, more particularly, means for reactivating a system operating in "sleep" mode.

2. Description of the Background Art

In the present invention, "electronic circuit" means a system including a central processing unit to which at least one peripheral unit may be connected, a system clock for providing a clock signal to all the logic means of the system, in particular to the central processing unit. All the components of the system are supplied by an electric supply source.

Generally, such a system may operate in one of the three following modes: "run" or "active" mode, "stand-by" or "halt" mode, and "sleep" mode.

When the system is in "run" mode, all its components operate. When it is in "stand-by" mode, only the peripheral units operate, and typically the central processing unit is halted, i.e. is no longer activated by the clock signal. And when the system is in "sleep" mode, all the components are halted, including the system clock, and only the supply source keeps the system supplied. Thus, most of the time, such a system operates in "sleep" mode, which allows a significant decrease in its electric power consumption to be achieved.

A problem encountered by the designers of a system of the type described above lies in achieving its reactivation, i.e. the passing thereof from "sleep" mode into "run" mode or "stand-by" mode.

A conventional solution to such a problem consists in providing, via means external to the system, a reset signal for reactivating the entire system. For example, such external means may be formed by a key having means for providing the reset signal to the system, when the key is moved close to the system, and activated by the action of a user.

A drawback of such a solution lies in the fact that it is necessary to use additional means for reactivating the system, which goes against usual industrial criteria as regards cost and space requirements.

Another drawback of this solution lies in the fact that it is necessary to use means external to the system for reactivating it, so that it can not be reactivated autonomously.

Another conventional solution to the aforementioned problem consists in creating a different time base to that provided by the system clock, the latter being deactivated in "sleep" mode. Said time base must be able to measure a time interval as soon as the system passes into "sleep" mode.

By way of example, European Patent Document EP No 586 256 discloses, in the field of mobile telephones, a system including a first clock or system clock operating at a high frequency, and a second clock operating at a lower frequency. The system clock may go into "sleep" mode, i.e. be deactivated for predetermined periods of time. The sleep duration may be measured by counting the number of low frequency pulses provided by the second clock.

A drawback of such a solution lies in the fact that it is necessary to calibrate the low frequency clock with respect to the system clock.

The applicant of the present invention has observed that the conventional solutions such as those described hereinbefore require means dedicated to the operation of the system in "sleep" mode, and that these means require a significant consumption of electric power. Typically such an operation requires a current which is commonly equal to several hundredths of nano-amperes ($1\ nA=10^{-9}\ A$) to several micro-amperes ($1\ \mu A=10^{-6}\ A$).

An object of the present invention is to provide a system including reactivating means, when the system is in "sleep" mode, this system overcoming the aforementioned drawbacks.

Another object of the present invention is to provide such a system having a low electric power consumption, during its "sleep" mode.

Another object of the present invention is to provide such a system meeting conventional industrial criteria as regards cost and complexity.

BRIEF DESCRIPTION OF THE INVENTION

These objects, in addition to others, are achieved by a system supplied by an electric power source, and able to operate in "sleep" mode, this system including a central processing unit;

a clock system arranged to supply, to the central processing unit, a clock signal at a first frequency;

oscillation detection means for monitoring the activity of the system clock; and means for reactivating the system, when the latter is in "sleep" mode, this system being characterised in that the reactivating means are internal to the system, and in that they are arranged so as to form, as soon as the system passes into "sleep" mode, an autonomous time base, to reactivate said system at the end of a predetermined time interval and, when the system is not in "sleep" mode, to fulfil a different function to that of time base and reactivation.

Such an arrangement has the advantage of allowing the system to be reactivated autonomously, without having to use means dedicated solely to the operation of the system in "sleep" mode, which rationalises the space requirement and cost thereof.

Another advantage of the reactivating means of the system according to the present invention lies in the fact that they are internal to or within the system, thus allowing the system to be reactivated without having to use external means, which rationalises the complexity of the system.

Another advantage of the reactivating means of the system according to the present invention lies in the fact that the oscillation detection means are used in "sleep" mode to form the autonomous time base, solely as soon as current is injected by the electric supply source, which only requires a low electric power consumption, during its operation in "sleep" mode.

An advantage of the storage means of the system according to the present invention lies in the fact that they are arranged so as to store a plurality of predetermined numbers of pulses, and to provide one of these numbers representing the predetermined time interval of the autonomous time base, which allows the duration of operation of the system in "sleep" mode to be varied.

These objects, features and advantages, in addition to others, of the present invention, will appear more clearly upon reading the detailed description of a preferred embodiment of the invention, given solely by way of example, in relation to the annexed drawings.

BRIEF DESCRIPTION OF THE DRAWINGS

FIGS. 3A, 3B, and 3C show three timing diagrams illustrating the waveforms of three signals relating to the oscillation detection means of FIG. 2, when the system of FIG. 1 is in "run" or "stand-by" mode;

FIGS. 4A, 4B, and 4C show three timing diagrams illustrating the waveforms of three signals relating to the oscillation detection means of FIG. 2, when the system of FIG. 1 is in "sleep" mode.

DESCRIPTION OF A SPECIFIC EMBODIMENT

Figure 1:
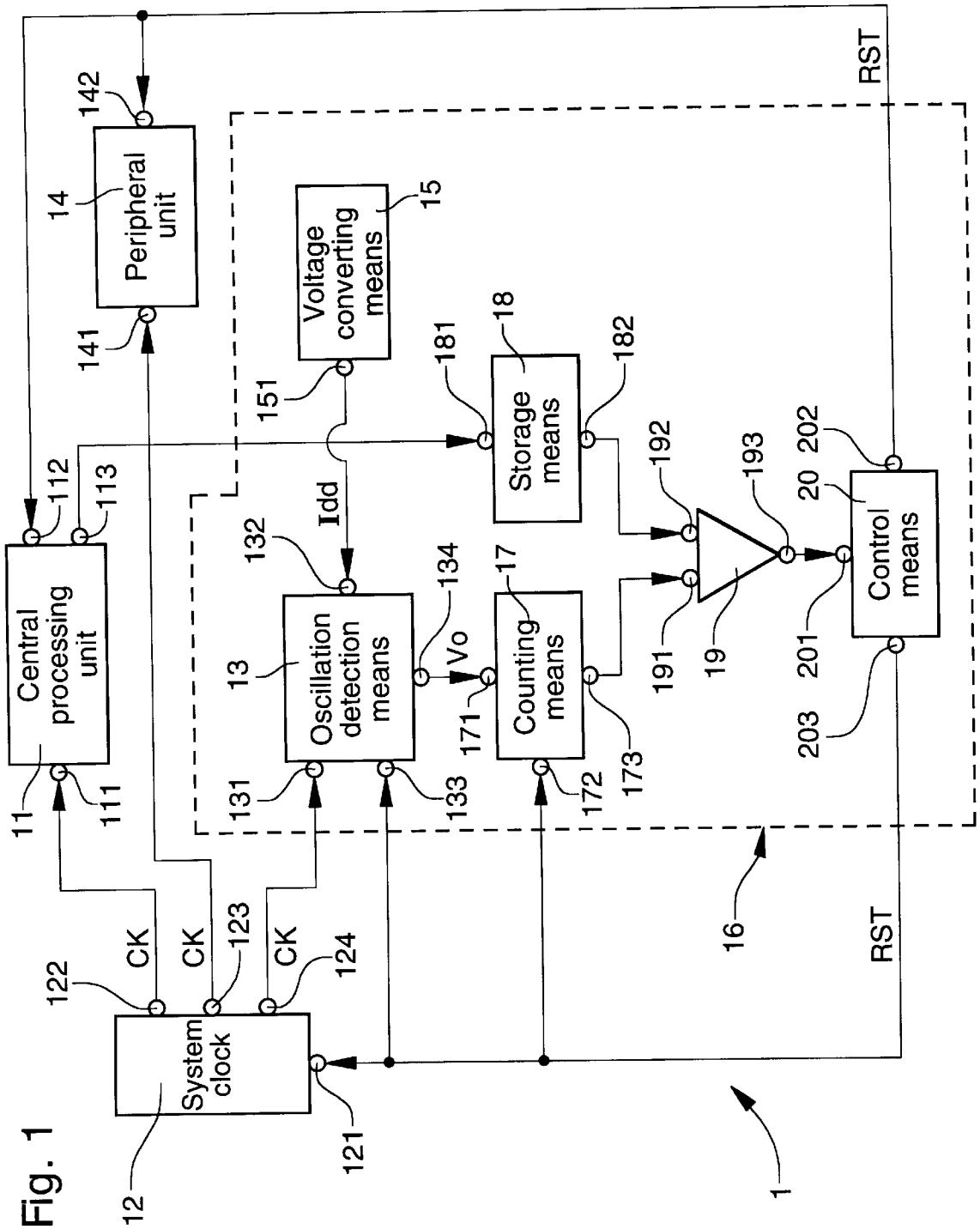
FIG. 1 shows a system according to the present invention.

FIG. 1 shows a system 1 according to the present invention.

System 1 includes a central processing unit 11, a system clock 12 and oscillation detection means 13. System 1 may also include at least one peripheral unit 14.

It goes without saying that system 1 also includes an electric supply source (not shown) arranged so as to provide a supply voltage Vdd referenced with respect to a ground voltage Vss. Each component of system 1 includes a supply terminal (not shown) intended to receive supply voltage Vdd, and a ground terminal (not shown) intended to receive ground voltage Vss. Thus, the different voltages present in system 1 are comprised within supply voltage Vdd and ground voltage Vss.

System 1 may also operate in one of the three "run", "stand-by" or "sleep" modes as described hereinbefore.

Central processing unit 11 includes first and second input terminals designated respectively 111 and 112, and an output terminal 113.

Peripheral unit 14 includes first and second input terminals 141 and 142. It goes without saying that this peripheral unit may further include at least one output terminal (not shown).

System clock 12 includes an input terminal 121 and first, second and third output terminals respectively designated 122 to 124. System clock 12 is arranged so as to be able to provide a clock signal CK, via terminals 122 to 124. For this purpose, terminal 122 is connected to terminal 111, so that central processing unit 11 may receive clock signal CK, via terminal 111. And terminal 123 is connected to terminal 141, so that peripheral unit 14 may receive clock signal CK, via terminal 141. Solely by way of example, the frequency of clock signal CK supplied by terminals 122 and 123, is typically of the order of 600 kHz.

Oscillation detection means 13 include first, second and third input terminals respectively designated 131 to 133, an output terminal 134. Oscillation detection means 13 are arranged for monitoring the activity of system clock 12. For this purpose, terminal 131 is connected to terminal 124, so that oscillation detection means 13 may receive clock signal CK at a first frequency. And oscillation detection means 13 are commonly called "watch-dog oscillator" or "analog watch-dog oscillator".

It is to be noted that the first frequency may be lower than the frequency of clock signal CK supplied to central processing unit 11 and to peripheral unit 14. By way of example, the first frequency is typically of the order of 500 Hz.

For this purpose, system clock 12 also includes a frequency division chain (not shown) arranged so as to receive an input signal having a frequency equal to 600 kHz, and to provide an output signal having a frequency of between 600 kHz and several Hz. It goes without saying that the different frequency values are given solely by way of illustrative example.

System 1 further includes voltage converting means 15 which include an output terminal 151. Voltage converting means 15 are arranged for receiving supply voltage Vdd, as has already been mentioned hereinbefore, and for providing in response a current Idd, via terminal 151. Voltage converting means 15 are preferably constituted of current mirrors arranged to supply current Idd, so that this current has a predetermined value. Solely by way of illustrative example, current Idd is substantially equal to 1 nA. Thus, terminal 151 is connected to terminal 132, so that oscillation detection means 13 may receive current Idd which is typically equal to 1 nA, for example.

The structure of oscillation detection means 13 of the system of FIG. 1 will be briefly recalled.

Figure 2:
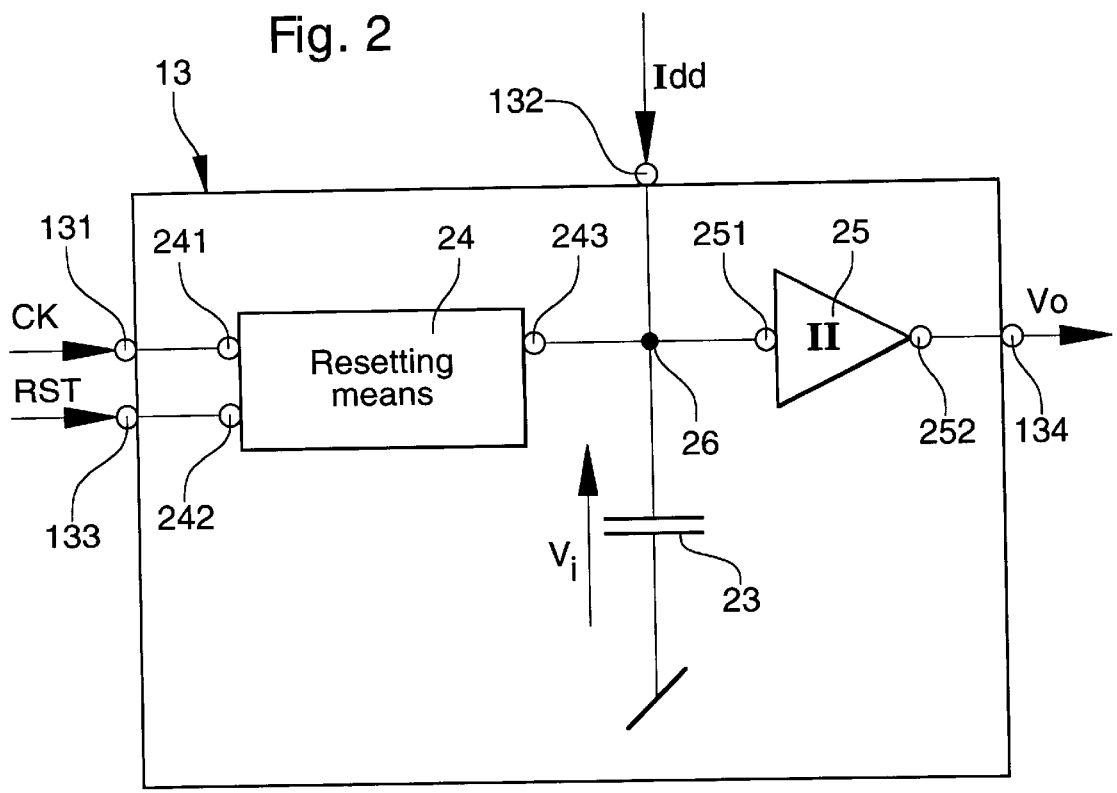
FIG. 2 shows a simplified electrical diagram of the oscillation detection means of FIG. 1.

FIG. 2 shows a simplified electric diagram of these means.

As has been described in relation to FIG. 1, oscillation detection means 13 include terminals 131 to 134.

As FIG. 2 shows, oscillation detection means 13 also include storage means 23, resetting means 24, and threshold detection means 25. A capacitor is preferably used for storage means 23, and a Schmidt Trigger circuit is used for threshold detection means 25.

A node 26 is connected to terminal 132 and to one of the two plates of capacitor 23, so that such capacitor is charged by current Idd supplied by terminal 132. The other plate of capacitor 23 is connected to ground.

Resetting means 24 include first and second input terminals designated respectively 241 and 242, and an output terminal 243. Resetting means 24 are arranged so as to be able to receive a resetting control signal, and to reset to zero the voltage at the terminals of capacitor 23, such voltage being designated Vi. Such a control signal may typically correspond to a rising edge of clock signal CK. For this purpose, terminal 241 is connected to terminal 131, so that resetting means 24 receive clock signal CK, and terminal 243 is connected to node 26, so as to be able to reset voltage Vi to zero.

Schmidt Trigger circuit 25 includes an input terminal 251 and an output terminal 252. Schmidt Trigger circuit 25 is arranged so as to be able to receive voltage Vi, to detect whether this voltage is greater than a voltage threshold $V_{th}$ and, when voltage Vi is greater than voltage threshold $V_{th}$, to supply a voltage Vo which corresponds to a pulse. For this purpose, terminal 251 is connected to node 26, so that Schmidt Trigger circuit 25 can receive voltage Vi, and terminal 252 is connected to terminal 134, so that voltage Vo is supplied as the output voltage of oscillation detection means 13.

It is to be noted, in the preferred case in which threshold detection means 25 are constituted by a Schmidt Trigger circuit, that voltage threshold $V_{th}$ corresponds to the switching point of this circuit.

The operation of oscillation detection means 13 of FIG. 2, in the event that system 1 is in "stand-by" or "run" mode, will briefly be recalled.

One will recall that, independently of the operating mode of system 1, all the components of this system are kept under voltage $V_{dd}$. Consequently, current Idd is injected continuously via terminal 132, and capacitor 23 is charged, so that voltage Vi is a linear function as a function of time t.

FIGS. 3A, 3B, and 3C show three timing diagrams 31 to 33 illustrating respectively the waveforms of clock signal CK, of voltage Vi and of voltage Vo.

At an initial instant t0, voltage Vi is zero, then grows in a linear manner with time t, as is shown by timing diagram 32. Moreover, when system 1 is in "run" or "stand-by" mode, clock signal CK periodically changes state, as is shown by timing diagram 31. One will recall that the frequency of clock signal CK is typically equal to 500 Hz. Thus, at instant t0, clock signal CK is low, for example equals to voltage Vss, and at an instant t1, changes state and becomes high, for example equals to voltage Vdd, as is shown by timing diagram 31. Following reception of the rising edge of clock signal CK at instant t1, means 24 reset voltage Vi which then resumes its initial value, as is shown by timing diagram 32. The situation is identical to that of instant t0, and is then repeated.

It will be noted that the example shown in FIGS. 3A, 3B, and 3C illustrate a normal operating situation of system 1 in "run" mode, or in "stand-by" mode. Clock signals CK are periodically supplied to oscillation detection means 13 so that voltage Vo does not change state, as is shown by timing diagram 33.

Solely by way of example, let us consider the following abnormal situation. For some reason, the frequency of clock signal CK continually decreases. Consequently, capacitor 23 is reset at the end of a period of time which continually increases, so that voltage Vi continues to increase in a linear manner with time until it reaches voltage threshold $V_{th}$, which causes Schmidt Trigger circuit 25 to switch. In this case, voltage Vo changes state. In other words, Schmidt Trigger circuit 25 supplies a resetting instruction for system 1, as is described hereinbelow.

It is to be noted that, when the system is in "sleep" mode, oscillation detection means 13 no longer monitor the activity of clock system 12, since the latter is deactivated.

As FIG. 1 shows, system 1 also includes means 16 for reactivating system 1, when the latter is operating in "sleep" mode.

Moreover, reactivating means 16 are internal to or arranged within system 1, so as to form, as soon as system 1 passes into "sleep" mode, an autonomous time base, to reactivate this system at the end of a predetermined time interval and, when system 1 is not in "sleep" mode, to fulfil a different function to those of time base and reactivating.

In the preferred embodiment shown in FIG. 1, reactivating means 16 include oscillation detection means 13 used in "sleep" mode for forming the autonomous time base, while monitoring in "run" or "stand-by" mode the activity of clock system 12, as was described hereinbefore in relation to FIGS. 3A, 3B, and 3C.

The operation of oscillation detection means 13, in the event that system 1 is in "sleep" mode, will briefly be recalled.

FIGS. 4A, 4B, and 4C show three timing diagrams 41 to 43 illustrating respectively the waveforms of clock signal CK, voltage Vi and voltage Vo, in the event that system 1 is in "sleep" mode.

Instant t0 shown in FIGS. 4A, 4B, and 4C is identical to that described in relation to FIGS. 3A, 3B, and 3C. At instant t1, voltage Vi is not reset, since clock signal CK does not change state, as is shown by timing diagram 41. Thus, this voltage continues to increase in a linear manner, as is shown by timing diagram 42. At an instant t3, typically 10 ms after instant t0, voltage Vi reaches voltage threshold Vth which is the switching point of circuit 25. Consequently, circuit 25 supplies an output pulse as voltage Vo, as is shown by timing diagram 43. Such a pulse may then be used for supplying a reset signal for system 1, which forms thus an autonomous time base capable of being triggered as soon as system 1 passes into "sleep" mode, and of reactivating it at the end of a time interval typically equal to 10 ms.

By way of improvement, as FIG. 1 shows, reactivating means 16 may also include counting means 17, storage means 18, comparing means 19 and control means 20.

Counting means 17 include first and second input terminals respectively designated 171 and 172, and an output terminal 173. Counting means 17 are arranged to be able to receive voltage Vo, i.e. to be able to receive pulses such as that supplied at instant t3 by oscillation detection means 13. Counting means 17 are also arranged to be able to count the number of pulses which are supplied thereto, and to supply this result to comparing means 19. For this purpose, terminal 171 is connected to terminal 134, so that counting means 17 can receive voltage Vo from oscillation detection means 13.

Storage means 18 include an input terminal 181 and an output terminal 182. Storage means 18 are arranged to store a plurality of predetermined numbers of pulses, and to supply one of these numbers to comparing means 19. For this purpose, terminal 181 is connected to terminal 113, so that the values stored in storage means 18 can be changed, via central processing unit 11. Storage means 18 preferably include an option register provided with a plurality of bits. One will recall that an option register is a register whose contents is not reset when the system including this register is reactivated. In other words, within the framework of the preferred embodiment shown in FIG. 1, the values stored in such a register may be change solely by rewriting via central processing unit 11 of system 1., or during initialisation of system 1, i.e. during connection of the supply source to the system.

By way of example, let us consider an option register with three bits B0 to B2. The value represented by bits B2, B1, B0 is equal to one of the predetermined numbers of pulses, the time unit being equal to 10 ms, i.e. the time interval between two successive pulses supplied in "sleep" mode by oscillation detection means 13. Table I hereinafter shows an example of correspondence between bits B2, B1 and B0 and the predetermined number of pulses N.

TABLE 1

| B2 | B1 | B0 | N |
|----|----|----|-----|
| 0 | 0 | 0 | 1 |
| 0 | 0 | 1 | 2 |
| 0 | 1 | 0 | 4 |
| 0 | 1 | 1 | 8 |
| 1 | 0 | 0 | 16 |
| 1 | 0 | 1 | 32 |
| 1 | 1 | 0 | 64 |
| 1 | 1 | 1 | 128 |

By way of improvement, a four bit option register may be provided, the fourth bit being used to validate or invalidate the autonomous time base function which oscillation detection means 13 can fulfil when system 1 is in "sleep" mode.

Also by way of improvement, an option register provided with a larger number of bits may be used, so as to be able to store a larger number of predetermined pulse numbers.

Comparing means 19 include first and second input terminals respectively designated 191 and 192, and an output terminal 193. Comparing means 19 are arranged to be able to receive the counted number of pulses, and one of the predetermined pulse numbers, to compare these numbers and, when they are equal, to supply a reset instruction signal to control means 20. For this purpose, terminal 191 is connected to terminal 173, so that comparing means 19 can receive the counted number of pulses, since the previous resetting of counting means 17. And terminal 192 is connected to terminal 182, so that comparing means 19 can receive one of the predetermined pulse numbers stored in storage means 18.

Control means 20 include an input terminal 201 and first and second output terminals respectively designated 202 and 203. Control means 20 are arranged so as to be able to control the set of reset signals for system 1, and to supply a resetting control signal to most of the components of system 1. For this purpose, terminal 201 is connected to terminal 193, so that control means 20 can receive the reset instruction signal supplied by comparing means 19. Terminal 202 is connected to terminals 112 and 142, so that means 20 can control the resetting of central processing unit 11 and peripheral unit 14, respectively. Terminal 203 is connected to terminals 121, 133 and 172 so that means 20 can control the resetting of clock system 12, oscillation detection means 13 and counting means 17, respectively.

In order to illustrate such control of the reset signals, let us consider the case in which system 1 is in "run" mode or "stand-by" mode, and an abnormal situation such as that described above occurs. A pulse is then supplied by oscillation detection means 13 and, in such case, control means 20 supply a resetting control signal for system 1.

Let us now consider the case in which system 1 is in "sleep" mode, and oscillation detection means 13 are used as time base for a predetermined time interval corresponding to a number N greater than 1. As FIG. 4C shows, at instant t3 a pulse is supplied as voltage Vo. Counting means 17 which are assumed to have been initialised at instant t0, supply a counted number of pulses equal to 1 which is different to predetermined number N. Consequently, comparing means 19 do not supply a reset instruction signal, and voltage Vi becomes zero. The situation is then identical to that at instant t0, and is repeated.

Consequently, in combination with logic means 17 to 20, oscillation detection means 13 supply pulses in "sleep" mode, typically every 10 ms, which forms thus a time base. The clock signal then supplied has a second frequency which is of the order of 100 Hz. It is to be noted that this frequency is significantly lower than 500 Hz, i.e. than the first frequency as defined hereinabove. It goes without saying that the different frequency values are given solely by way of illustrative example.

The man skilled in the art will note that the frequency of oscillation detection means 13 depends upon the capacitance of capacitor 23, and the intensity of current Idd, described in relation to FIG. 2.

It will be noted that this system is particularly advantageous, since the embodiment of an autonomous time base such as that described hereinbefore, requires only a low electric power consumption. Indeed, operation relies mainly upon the injection of current Idd to charge capacitor 23.

It will also be noted that this system is particularly advantageous, since the area required to achieve such an arrangement is limited to that of logic means 17 to 20. Indeed, oscillation detection means 13 are generally present in such a system.

The operation of system 1 described in relation to FIGS. 1, 3A to 3C, and 4A to 4C, when the latter passes from "run" mode or "stand-by" mode, into "sleep" mode, and vice versa, will now be described.

Figure 5A:
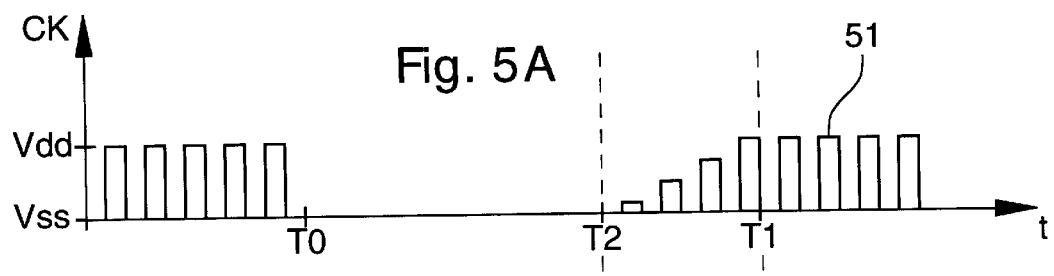
FIGS. 5A, 5B, and 5C show three timing diagrams illustrating respectively the waveforms of three signals present in the system of FIG. 1, when the latter operates in "run", "stand-by" or "sleep" mode.
Figure 5B:
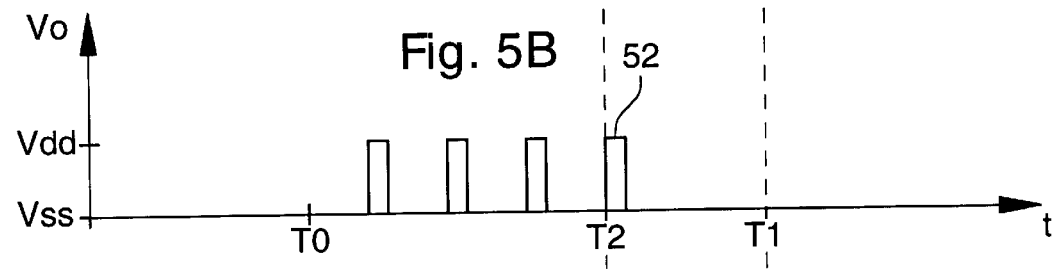
Figure 5C:
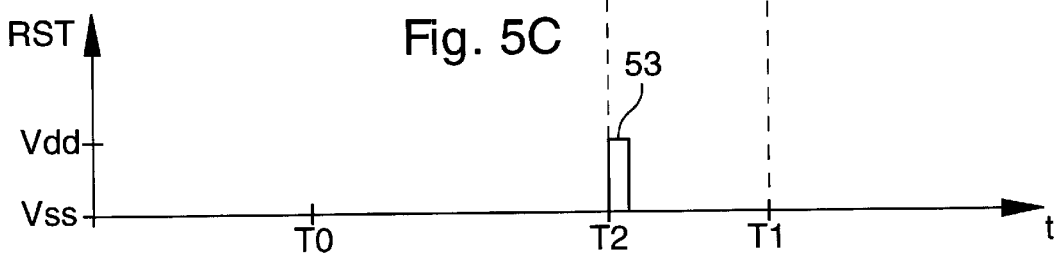

FIGS. 5A, 5B, and 5C show three timing diagrams 51 to 53 illustrating respectively the waveforms of clock signal CK, of voltage Vo, and of reset signal RST.

System 1 is in "run" mode, or "stand-by" mode, during the time interval up to an instant T0, and for the time interval beginning at an instant T1. During these time intervals, clock system 12 is activated, and clock signal CK periodically changes state, as timing diagram 51 shows. During the same periods, voltage Vo supplied by oscillation detection means 13 is thus zero, as is reset signal RST, as is shown by timing diagrams 52 and 53. It goes without saying that such as situation corresponds to a normal situation, as has already been described previously.

After instant T0, system 1 is in "sleep" mode. Thus, clock system 12 is deactivated, and clock signal CK no longer periodically changes state, as timing diagram 51 shows. During the same period, oscillation detection means 13 supply a pulse every 10 ms, as timing diagram 52 shows. Let us consider that predetermined pulse number N has been selected to be equal to 4, reset signal RST is zero, as long as the counted number of pulses is not equal to 4, as timing diagram 53 shows. At an instant T2, the counted number of pulses is equal to 4. Thus, comparing means 19 supply a pulse, as timing diagram 53 shows. The period of time which elapses between instants T1 and T2 corresponds to a reaction time of system 1, and to a stabilising time for such system, following the reset signal supplied at instant T2. Thus, at instant T1, the situation is similar to the initial situation, prior to instant T0.

It goes without saying for the man skilled in the art that the detailed description hereinbefore may undergo various modifications without departing from the scope of the present invention. By way of alternative embodiment, these oscillation detection means can be replaced by means internal to the system, such means being capable of forming, as soon as the system passes into "sleep" mode, an autonomous time base, reactivating this system at the end of a predetermined time interval and, when the system is not in "sleep" mode, fulfilling a different function to that of time base and reactivation.

I claim:

1. A system supplied by an electric power source and comprising a central processing unit and a system clock, said system being able to operate in "sleep" mode during which said central processing unit and said system clock are deactivated, this system including:

the central processing unit;

a system clock connected to said central processing unit for supplying a clock signal at a first frequency;

oscillation detection means connected to said system clock for monitoring the activity of the system clock when said system operates in a "run" mode or in a "stand-by" mode; and reactivating means connected to said central processing unit and said system clock for reactivating said central processing unit and said system clock when said system is in "sleep" mode, wherein said reactivating means is internal to the system and includes said oscillation detection means which forms, while the system is in "sleep" mode, an autonomous time base for reactivating said central processing unit and said system clock at the end of a predetermined time interval.

2. The system of claim 1, wherein said oscillation detection means is arranged when said system is in "sleep" mode, to supply pulses for reactivating said central processing unit and said system clock, said pulses having a second frequency which is lower than said first frequency.

3. The system of claim 2, wherein said reactivating means also includes counting means arranged so as to receive the pulses from said oscillation detection means, to count a predetermined number of received pulses representing said predetermined time interval of operation of said autonomous time base, and to supply, after said predetermined number of received pulses, a pulse intended to reset the system.

4. The system of claim 2 wherein said reactivating means further includes:

storage means arranged so as to store at least one predetermined number representing said predetermined interval of operation of said autonomous time base, and to supply this predetermined number to a comparing means; and counting means arranged so as to receive the pulses from said oscillation detection means, to count the number of received pulses, and to supply this number to said comparing means;

said comparing means being arranged so as to compare the number supplied by said counting means and said at least one predetermined number supplied by said storage means and, when these numbers are equal, to supply a pulse intended to reset the system.

5. The system of claim 4, wherein said storage means includes an option register containing a plurality of bits.

6. The system of claim 5, wherein said option register contains at least two bits, and wherein one of these two bits is intended to validate or invalidate the autonomous time base function which said oscillation detection means can fulfil when said system is in "sleep" mode.

* * * * *